United States Patent Office 3,450,612
Patented June 17, 1969

3,450,612
PHOTOCHEMICALLY HARDENABLE MOULDING AND COATING MASSES
Hans Rudolph, Krefeld-Bockum, Karl-Heinz Heller, Moers, and Hermann Schnell, Krefeld-Urdingen, Germany, assignors to Farbenfabriken Bayer Aktiengesellschaft, Leverkusen, Germany, a corporation of Germany
No Drawing. Filed Nov. 18, 1965, Ser. No. 508,567
Claims priority, application Germany, Dec. 31, 1964, F 44,857
Int. Cl. B01j 1/10
U.S. Cl. 204—159.15                11 Claims

---

ABSTRACT OF THE DISCLOSURE

A photochemically hardenable moulding and coating mass comprising a mixture of unsaturated polyester and copolymerizable monomeric compounds and an active amount of a sensitizer of the formula:

$$Ar_1\text{—}S\text{—}S\text{—}Ar_2$$

wherein $Ar_1$ and $Ar_2$ are aryl radicals.

---

It is known that unsaturated compounds can be polymerized by photochemical methods. In comparison with a polymerization catalyzed by additives, the advantages of such a process are obvious: it is a matter of only a single component system which, due to the absence of additives, generally enables satisfactory, especially almost colourless, polymers to be hardened.

Photochemical polymerizations can be considerably accelerated in known manner by sensitizers. However, the action of sensitisors, as follows from many publications, is extremely dependent on specific substrates. Due to this fact, a very great number of substances belonging to the greatest variety of compound classes have been recommended as sensitizers.

As sensitisors for the photochemical polymerization of moulding masses produced from unsaturated polyesters and copolymerizable monomeric compounds, substances have previously been proposed which belong to three different groups, viz. (1) O-alkyl xanthic acid esters which are activated by a double bond in the β-position to the S-atom, as well as (2) benzoin with some of its derivatives, and also (3) certain halogen compounds. However, none of the substances belonging to these groups has proved to be of any use since substantial disadvantages prevent their application. For example, the compounds mentioned under (1), provided they possess sufficient activity, are very difficult to obtain. The substances mentioned under (2) though easier to obtain, reduce the "dark storability" of the polyester moulding masses to such an extent that it is no longer possible to speak of stable single component systems. Furthermore, they lead to more or less strong discolorations of the hardened product. For the same reason, i.e. because of discolorations of the hardened moulded products, the compounds mentioned under (3) have also not been satisfactory. Furthermore, they are, as a rule, substantially less effective than the previously mentioned substances.

The object of the present invention are photochemically hardenable moulding and coating masses of unsaturated polyesters and copolymerizable monomeric compounds which are characterized by a content of compounds of the formula $Ar_1\text{—}S\text{—}S\text{—}Ar_2$, wherein $Ar_1$ and $Ar_2$ signify aromatic radicals.

These masses are characterized in that, when subjected to ultra-violet irradiation, they harden to almost colourless moulded articles or coatings. There should also be emphasized the extraordinarily high reactivity of the masses according to the invention which, in the presence of thin layers, renders possible an extremely rapid hardening. A further advantage of the products according to the invention consists in that, in the case of storage in the dark, their storability is practically unlimited and that they can therefore be used as stable single component systems.

According to U.S. Patent No. 2,460,105, disulphides are generally effective as sensitizers in the ultra-violet polymerization of some unsaturated monomeric compounds, viz. in such a manner that the disulphide-containing monomers are converted into polymers, by irradiation for many hours under nitrogen, possibly at a substantially elevated temperature, in part, in a very varying degree depending on the nature of the monomers. However, the published results which are valid only for certain monomers, i.e. vinyl esters, vinyl halides, vinyl ketones, vinyl ethers, vinyl cyanides, (meth) acrylic acid esters, vinylidene halides and styrene, do not indicate the extraordinary advantages of the aromatic disulphides for the use in unsaturated polyester moulding masses.

In the meaning of the invention, the term unsaturated polyesters includes, as is usual, polycondensation products from α,β-unsaturated dicarboxylic acids, such as maleic acid, fumaric acid, itaconic acid, mesaconic acid and citraconic acid, with polyols, such as ethylene glycol, diethylene glycol, propane-, butane-, hexane-diol, trimethylol-propane and pentraerythritol. Part of the unsaturated acids can be replaced by saturated acids, for example, succinic acid, glutaric acid, adipic acid, phthalic acid, tetrachlorophthalic acid, hexachloro-endomethylene-tetrahydrophthalic acid and trimellitic acid. Further modifications are possible by incorporating monohydric alcohols, such as butanol, butyl-glycol and tetrahydro-furfuryl alcohol, as well as by incorporating monobasic acids, such as benzoic acid, oleic acid, linseed oil fatty acid and dehydrated castor oil fatty acid. According to the invention, there can also be used so-called air-drying moulding masses which, apart from radicals of α,β-unsaturated dicarboxylic acids, also contain β,γ-unsaturated ether radicals, either as components of the polyesters or as components of other mixed components.

The term copolymerizable monomeric compounds comprises the unsaturated copolymerizable compounds, usual in polyester technology, with vinyl groups possibly substituted in the α-position or allyl groups possibly substituted in the β-position, e.g. styrene, vinyl-toluene, divinyl-benzene, vinyl acetate, acrylic acid and their esters, acrylonitrile, methacrylic acid and their corresponding derivatives, as well as allyl esters, such as allyl acetate, allyl acrylate, phthalic acid diallyl ester, triallyl phosphate and triallyl cyanurate.

As examples of disulphides to be used according to the invention, there may be mentioned: diphenyl disulphide, 4,4'-dimethyl-diphenyl disulphide, 2,2',5,5' - tetramethyldiphenyl disulphide, 2,2',4,4'-tetramethyl-diphenyl disulphide, 3,3',4,4'-tetramethyl-diphenyl disulphide, 4,4'-di tert.-butyl-diphenyl disulphide, 2,2',6,6'-tetramethyl-4,4'-di-tert.-butyl-diphenyl disulphide, 4,4'-dichloro - diphenyl disulphide, 2,2',4,4',5,5'-hexachloro-diphenyl disulphide, 4,4'-dimethoxy-diphenyl disulphide, α,α'-dinaphthyl disulphide and β,β'-dinaphthyl disulphide.

In order to increase the storage stability, the moulding masses can be mixed with known inhibitors, e.g. p-benzoquinone, 2,5-di-tert.-butyl-quinone, hydroquinone, tert.-butyl-pyrocatechol, 3-methyl-pyrocatechol and 4-ethyl-pyrocatechol, and also copper compounds, e.g. copper naphthenate.

The moulding and coating masses modified according to the invention contain the disulphides preferably in amounts of about 0.1 to about 5 percent by weight.

The disulphides can be used by themselves or in admixture, possibly also in admixture with catalysts of another kind, e.g. peroxides, preferably choosing in the latter case, the more stable peroxides, e.g. tert.-butyl-perbenzoate, dicumyl peroxide, cumyl butyl peroxide, benzoyl peroxide and lauroyl peroxide, to ensure a good storage stability. Combinations of disulphides with peroxides may be especially advantageous because the latter are stimulated to act for the polymerization catalysis by the heat generated by the ultra-violet irradiation. When peroxides are concurrently used, the customary accelerators, e.g. cobalt and vanadium compounds, can also be used, an additional amount of reactivity is thus obtained but, on the other hand, a loss in the storage life of the masses and in the colour of the hardened products must be accepted.

The masses according to the invention can be used for the production of coatings and moulded articles. When coatings are produced from the polyester moulding masses modified according to the invention with air-drying properties, there are advantageously used as air-drying catalysts, soluble vanadium compounds, especially vanadium salts of partially esterified phosphorus acids, furthermore chelate-like compounds, e.g. vanadyl acetyl-acetonate, or carboxylic acid salts, such as vanadium naphthenate, possibly in admixture with acids of phosphorus or derivatives forming such acids.

The modification according to the invention has an especially favourable effect on the polyester lacquer raw materials in which the polymerization-inhibiting action of atmospheric oxygen is excluded by the concurrent use of wax-like substances, such as paraffins having a melting point between about 40 and about 70° C., montan wax, ceresin, bees' was, specmaceti wax, synthetic ester waxes and long chain fatty acids, such as stearin acid. A recent method of working up these masses employing assembly line methods requires the utmost speed of the final polymerization to produce hard coatings. In principle, it is possible to assist the polymerization process by a supply of heat, since, however, on the other hand, the formation of a wax film which is necessary for the exclusion of air, is prevented by heating, an additional thermal acceleration can be applied only when the wax film has floated. In the case of the previous polymerization systems based on peroxides and accelerators, the period of time which elapses between the beginning of the hardening and the floating of the wax is, however, so long that an assembly line-type working up of the wax-containing masses is, in practice, hardly possible. In contradistinction, the products according to the invention are characterized in that, when subjected to ultra-violet irradiation, they form a wax film in a very short time which counld not be achieved even approximately, by the previously known methods, thus rendering possible a rapid working up according to assembly line methods.

In the production of moulded articles produced from masses modified according to the invention, it is also especially advantageous that the masses can be hardened by appropriately measured irradiation, without any noticeable heat supply, so that almost crack-free moulded articles are formed. If necessary, the hardening may be interrupted by darkening and thus completed with the intermediate production of prepolymers. These prepolymers are stable when stored in the dark, and prevent, in part, the polymerization shrinkage. Furthermore, they offer a greater variety of possible working up processes than the non-prepolymerized moulding masses.

The most effective radiations within the meaning of the invention have wave lengths between about 2500 A. and about 4000 A. besides sunlight, ultra-violet light sources, are preferably mercury, tungsten and xenon lamps.

Further details are to be obtained from the following examples, which are given for the purpose of illustrating the invention.

Example 1

An unsaturated polyester, produced by the condensation of 152 parts by weight of maleic anhydride, 141 parts by weight of phthalic anhydride and 195 parts by weight of propane-1,2-diol, is mixed with 0.045 part by weight of hydroquinone and dissolved in styrene to give a 65% solution. To 100 parts by weight of amounts of the resin-yielding material obtained, there are admixed 20 parts by weight of styrene, 4 parts by weight of a 2.5% solution of paraffin (M.P. 60° C.) in styrene, as well as the disulphides listed in the table.

The solutions so obtained are applied to glass plates with a film coater (240μ), left at a distance of 40 cm. from a mercury UV lamp (700 watt) until the paraffin floats and subsequently for a further 30 minutes at a distance of 16 cm.

TABLE 1

| Addition, referred to the resin-yielding material | Time of flotation of the paraffin (min.) |
| --- | --- |
| 2% diphenyldisulfide | 2 |
| 2% di-β-naphthyl-disulfide | 2 |
| 2% 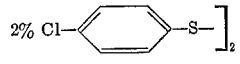 | 2.5 |
| 2% 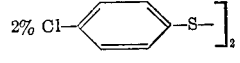 | 2.5 |
| 2% 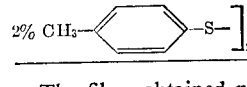 | 2 |

The films obtained possess pencil hardnesses over 6 H and are almost colourless.

Example 2

100 parts by weight of the resin-yielding material mentioned in Example 1 are mixed with 40 parts by weight of styrene, 2 parts by weight of a 10% paraffin solution in toluene, 1 part by weight of dipenhyl disulphide, as well as, in addition, with various peroxides and peroxide accelerator systems (see Table 2).

240μ thick layers of this solution are applied to glass plates with a film coater and left under a 700 watt mercury UV lamp at a distance of 43 cm. until the paraffin floats and then for a further 15 minutes at a distance of 16 cm.

TABLE 2

| Additives, referred to resin: yielding material: | Flotation time of the paraffin (min.) |
| --- | --- |
| (1) 4% tert.-butyl-perbenzoate solution 50% in plasticiser | 2.5 |
| (2) 4% benzoyl peroxide paste, 50% in plasticiser | 4 |
| (3) 4% tert.-butyl-perbenzoate solution, 50% in plasticiser, +1% co-naphthenate solution, 20% in toluene | 2.5 |
| (4) 2% dicumyl peroxide (90%), +1% co-naphthenate solution, 20% in toluene | 3.5 |

The films mentioned under (1) and (2) are practically colourless and those mentioned under (3) and (4) are pale pink. All films possess pencil hardnesses over 6 H.

Example 3

10 g. of the resin-yielding material mentioned in Example 1 are mixed with 4 g. of styerne and 0.28 g. of diphenyl disulphide. The solution present in a test tube gells in sunlight after about 20 minutes. After about 8 hours' storage in sunlight, a colourless, crack-free, hard block polymer is obtained.

When stored in the dark (room temperature), the diphenyl disulphide-containing solution keeps for longer than 5 months.

Example 4

An unsaturated polyester obtained by the condensation of 1765 parts by weight of maleic anhydride, 756 parts by weight of glycol, 405 parts by weight of butane-1,3-diol and 1540 parts by weight of trimethylol-propane diallyl ether in the presence of 0.83 part by weight of hydroquinone, is dissolved in styrene to give a 75% solution. 100 g. of the resin-yielding material obtained are mixed with 2 g. of diphenyl disulphide and 1 ml. of a vanadium siccative solution (V content 1.1%). The vanadium siccative is obtained by dissolving freshly precipitated $V(OH)_4$ in a mixture of about 32 parts by weight of phosphoric acid monobutyl ester, about 43 parts by weight of phosphoric acid dibutyl ester and about 50 parts by weight of toluene, followed by separation of the water.

The siccativated solution is left, as a 240μ thick layer, at a distance of 43 cm. from a 700 watt mercury UV lamp. After 25 minutes' irradiation, the film is dry.

Example 5

100 g. of the resin-yielding material described in Example 4 are mixed with 1 g. of diphenyl disulphide, 1 ml. of the previously mentioned siccative solution and 4 g. of a 50% solution of tert.-butyl perbenzoate (in plasticiser).

The film applied and irradiated according to Example 4, is already dry after 15 minutes.

Example 6

100 parts by weight of the resin-yielding material mentioned in Example 1 are mixed with 2 parts by weight of diphenyl disulphide. The solution so obtained is put between 2 glass plates in such a manner that a 3 mm. thick resin layer is formed which is covered on both sides by glass.

The test specimens obtained are then irradiated on both sides for 7 minutes with a 700 watt mercury UV lamp (distance 40 cm.).

A flaccid prepolymer (shore hardness 20–25) is obtained.

After 7 days' dark storage, the unchanged flaccid prepolymer is again clamped between glass plates and then irradiated on both sides for 1 hour under otherwise identical conditions. A hard, colourless polymer is obtained.

What we claim is:

1. A photochemically hardenable moulding and coating mass comprising a mixture of unsaturated polyester and a copolymerizable monomeric compound, said mixture also having an active amount of a disulfide photosensitizer of the formula $Ar_1$-S-S-$Ar_2$, wherein $Ar_1$ and $Ar_2$ are aryl radicals.
2. The moulding and coating mass of claim 1, wherein the disulphide is a member selected from the group consisting of diphenyl disulphide,
4,4'-dimethyl-diphenyl disulphide,
2,2',5,5'-tetramethyl-diphenyl disulphide,
2,2',4,4'-tetramethyl-diphenyl disulphide,
3,3',4,4'-tetramethyl-diphenyl disulphide,
4,4'-dichloro-diphenyl disulphide,
2,2',6,6'-tetramethyl-4,4'-di-tert.-butyl-diphenyl disulphide,
4.4'-dichloro-diphenyl disulphide,
2,2',4,4',5,5'-hexachloro-diphenyl disulphide,
4,4'-dimethoxy-diphenyl disulphide,
$α,α'$-dinaphthyl disulphide and
$β,β'$-dinaphthyl disulphide.
3. The moulding and coating mass of claim 1, wherein the disulphide is present in an amount of about 0.1–5 percent by weight.
4. The moulding and coating mass of claim 1 containing an active amount of an aditional inhibitor selected from the group consisting of p-benzo-quinone, 2,5-di-tert.-butylquinone, hydroquinone, tert. - butyl - pyrocatechol, 3-methyl-pyrocatechol and 4-ethyl-procatechol, and copper naphthenate.
5. The moulding and coating mass of claim 1 having a catalytic amount of an organic peroxide as a polymerization catalyst.
6. The moulding and coating mass of claim 5, wherein the organic peroxide is a member selected from the group consisting of tert.-butyl-perbenzoate, dicumyl peroxide, cumyl butyl peroxide, benzoyl peroxide and lauroyl peroxide.
7. The moulding and coating mass of claim 5 having an active amount of an accelerator.
8. The moulding and coating mass of claim 7, wherein the accelerator is a member selected from the group consisting of cobalt and vanadium compounds.
9. The moulding and coating mass of claim 8, wherein the vanadium compounds are members selected from the group consisting of a vanadium salt of a partially esterified phosphorous acid, vanadyl acetyl-acetonate and vanadium naphthenate.
10. The moulding and coating masses according to claim 7 containing a wax-like substance selected from the group consisting of paraffin having a melting point of about 40–70° C., montan wax, ceresin, bees' wax, spermaceti wax, synthetic ester wax and long chain fatty acids.
11. A process for producing moulded articles and coatings which comprises irradiating articles produced from the moulding and coating mass of claim 1 with electromagnetic waves having a wave length of about 2500 A.–4000 A.

References Cited

UNITED STATES PATENTS 3,014,799 12/1961 Oster _____ 204—159.2
3,097,150 7/1963 Rainer et al. _____ 204—159.15
3,163,627 12/1964 Craver _____ 260—861

SAMUEL H. BLECH, *Primary Examiner.*

RICHARD B. TURER, *Assistant Examiner.*

U.S. Cl. X.R.

204—159.24; 260—22, 28.5, 861, 863, 866